United States Patent
Sears

(10) Patent No.: US 10,669,682 B2
(45) Date of Patent: Jun. 2, 2020

(54) ICE RE-CONDITIONING ASSEMBLY

(71) Applicant: James Sears, Eagen, MN (US)

(72) Inventor: James Sears, Eagen, MN (US)

(*) Notice: Subject to any disclaimer, the term of this patent is extended or adjusted under 35 U.S.C. 154(b) by 153 days.

(21) Appl. No.: 16/019,665

(22) Filed: Jun. 27, 2018

(65) Prior Publication Data

US 2020/0002909 A1    Jan. 2, 2020

(51) Int. Cl.
*E01H 4/02* (2006.01)
*G05D 1/02* (2020.01)
*G09F 21/04* (2006.01)

(52) U.S. Cl.
CPC ........... *E01H 4/023* (2013.01); *G05D 1/0238* (2013.01); *G05D 1/0274* (2013.01); *G09F 21/04* (2013.01)

(58) Field of Classification Search
CPC ..... E01H 4/023; G05D 1/0238; G05D 1/0274
USPC ...................................................... 56/10.2 A
See application file for complete search history.

(56) References Cited

U.S. PATENT DOCUMENTS

| | | | |
|---|---|---|---|
| 7,059,012 B2 | 6/2006 | Song | |
| 7,510,247 B2 | 3/2009 | Pirlla | |
| 7,552,539 B2 | 6/2009 | Pickutowski | |
| 7,555,363 B2* | 6/2009 | Augenbraun | A47L 5/225 700/253 |
| D670,877 S | 11/2012 | Geringer | |
| 8,671,596 B2 | 3/2014 | Manion | |
| 9,062,425 B2 | 6/2015 | Schlupp | |
| 9,512,579 B2* | 12/2016 | van Eijl | E01H 4/023 |
| 2006/0226695 A1* | 10/2006 | Pirila | E01C 19/006 299/1.5 |
| 2014/0237862 A1* | 8/2014 | van Eijl | E01H 4/023 37/222 |
| 2017/0088010 A1* | 3/2017 | Tonks | B60L 58/26 |
| 2018/0272959 A1* | 9/2018 | Hornsby | B60R 13/00 |
| 2019/0026779 A1* | 1/2019 | DeLucia | G09G 5/003 |
| 2019/0276015 A1* | 9/2019 | Harvey | B60W 30/09 |
| 2020/0010025 A1* | 1/2020 | Hornsby | B60R 16/033 |

FOREIGN PATENT DOCUMENTS

WO    WO02097198    12/2002

* cited by examiner

*Primary Examiner* — Abigail A Risic

(57) ABSTRACT

An ice re-conditioning assembly includes a vehicle that is driven on ice in an ice skating rink. A drive unit is coupled to the vehicle for driving the vehicle around the ice skating rink in a pre-determined route. A plurality of resurfacing units is each movably coupled to the vehicle. Each of the resurfacing units is urged into a deployed position to engage the ice for reconditioning the ice for skating. Each of the resurfacing units is urged into a stored position has each of the resurfacing units being contained within the vehicle and being spaced from the ice. A plurality of displays is provided and each of the displays is coupled to the vehicle. Each of the displays displays indicia comprising words and images for advertising purposes.

18 Claims, 6 Drawing Sheets

ICE RE-CONDITIONING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to re-conditioning devices and more particularly pertains to a new re-conditioning device for automatically re-conditioning ice in an ice skating rink.

BRIEF SUMMARY OF THE INVENTION

An embodiment of the disclosure meets the needs presented above by generally comprising a vehicle that is driven on ice in an ice skating rink. A drive unit is coupled to the vehicle for driving the vehicle around the ice skating rink in a pre-determined route. A plurality of resurfacing units is each movably coupled to the vehicle. Each of the resurfacing units is urged into a deployed position to engage the ice for reconditioning the ice for skating. Each of the resurfacing units is urged into a stored position having each of the resurfacing units being contained within the vehicle and being spaced from the ice. A plurality of displays is provided and each of the displays is coupled to the vehicle. Each of the displays displays indicia comprising words and images for advertising purposes.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWINGS(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
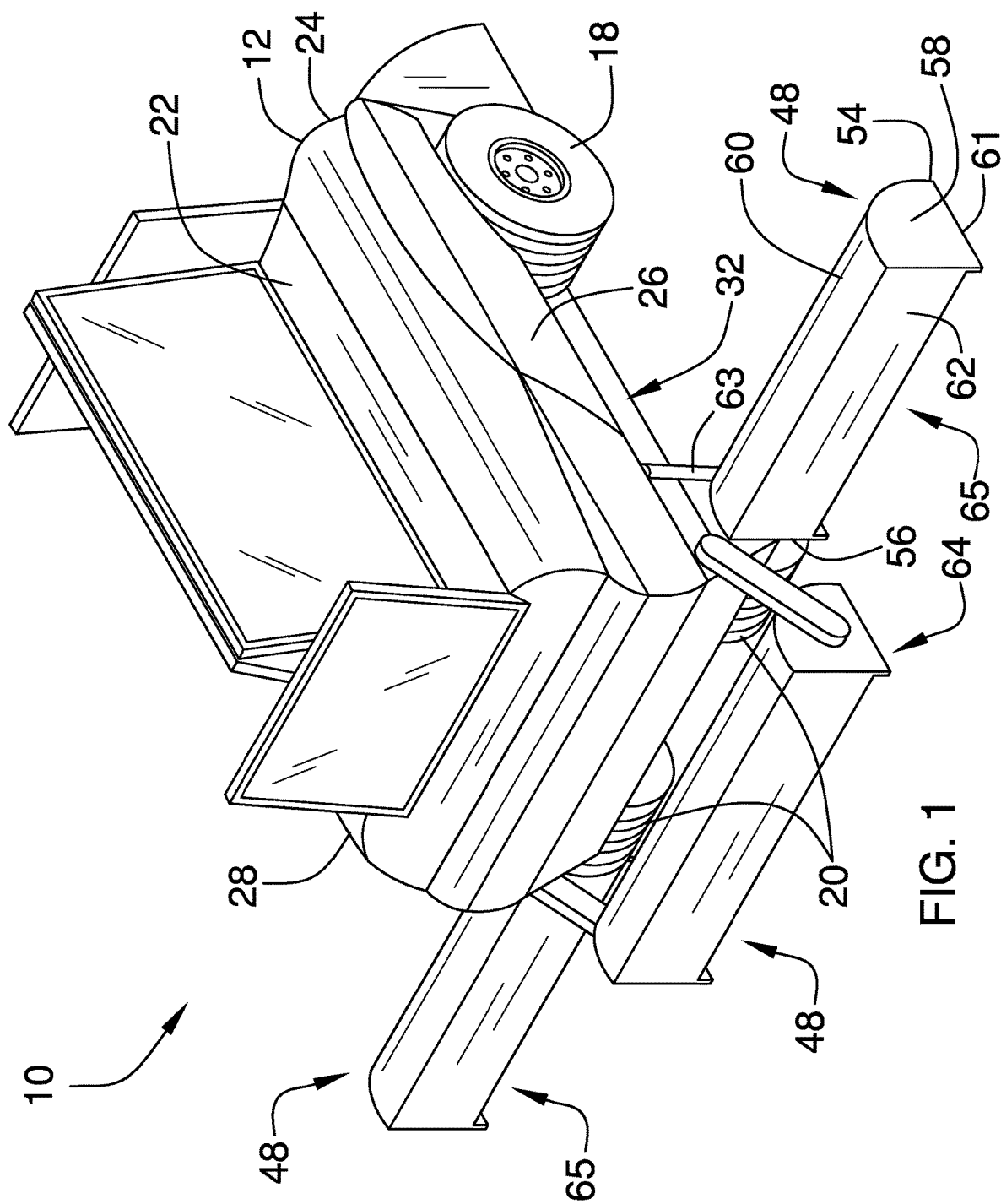
FIG. 1 is a top perspective view of an ice re-conditioning assembly according to an embodiment of the disclosure.
Figure 2:
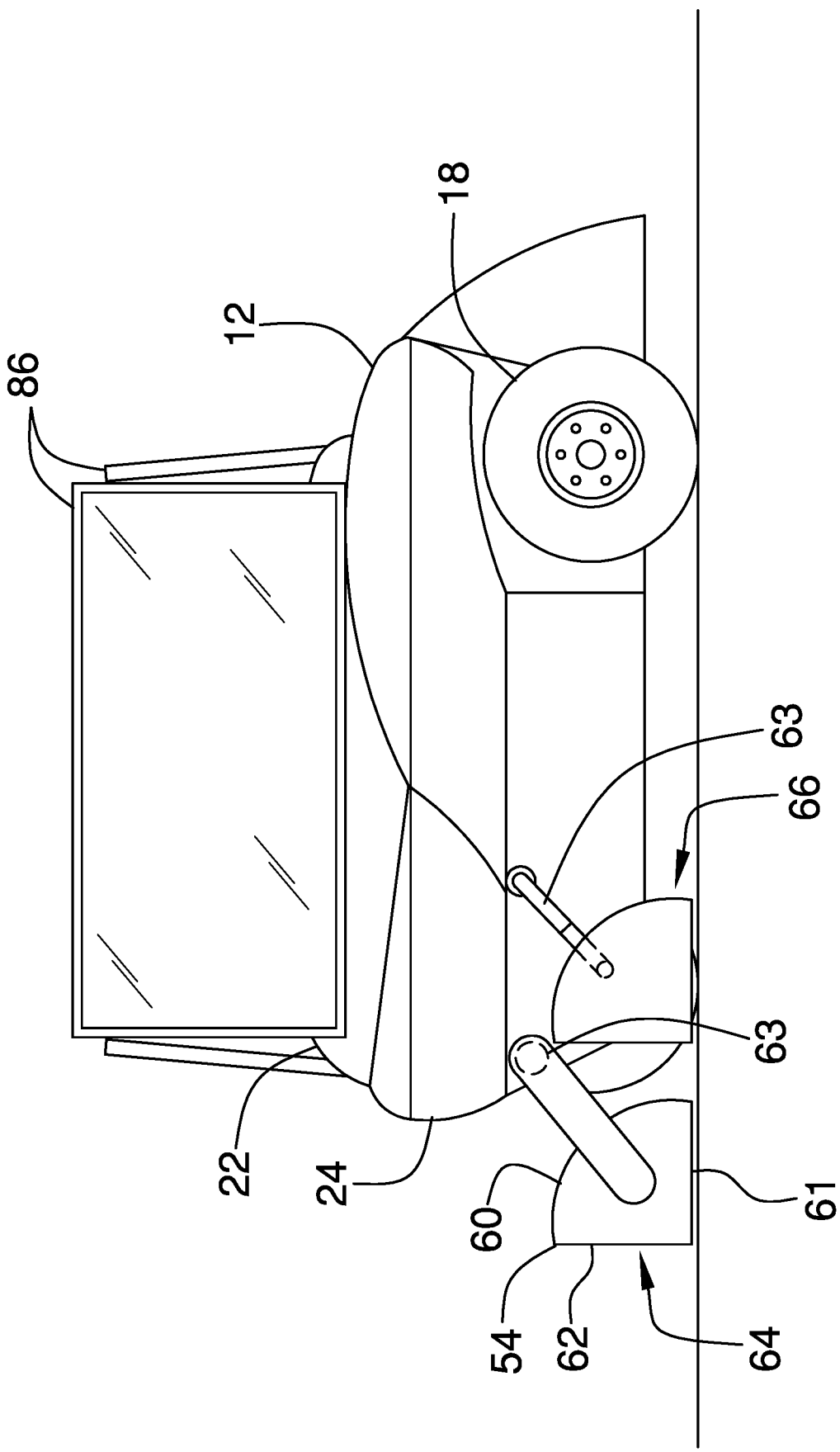
FIG. 2 is a right side view of an embodiment of the disclosure.
Figure 3:
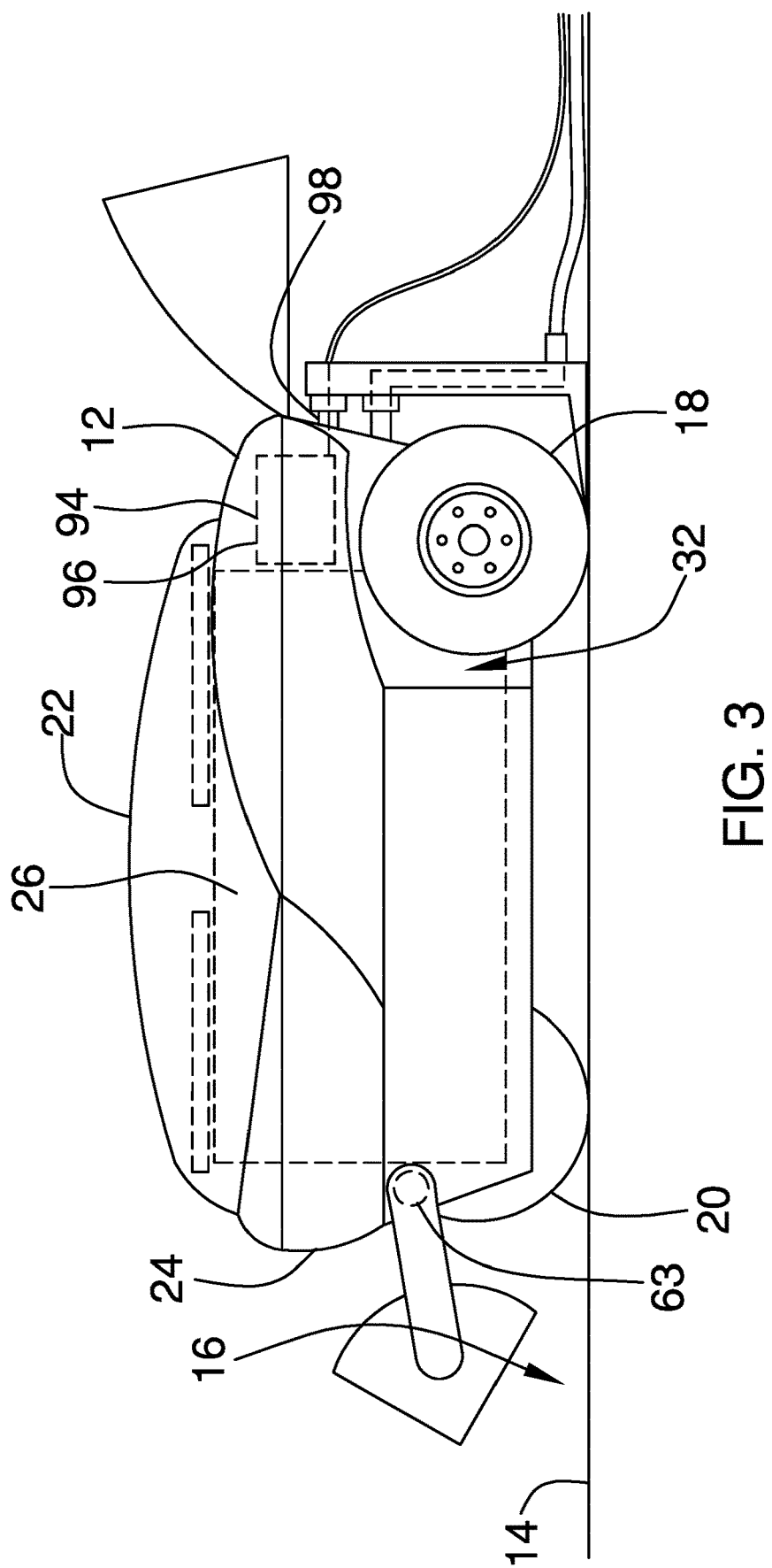
FIG. 3 is a right side phantom view of an embodiment of the disclosure.
Figure 4:
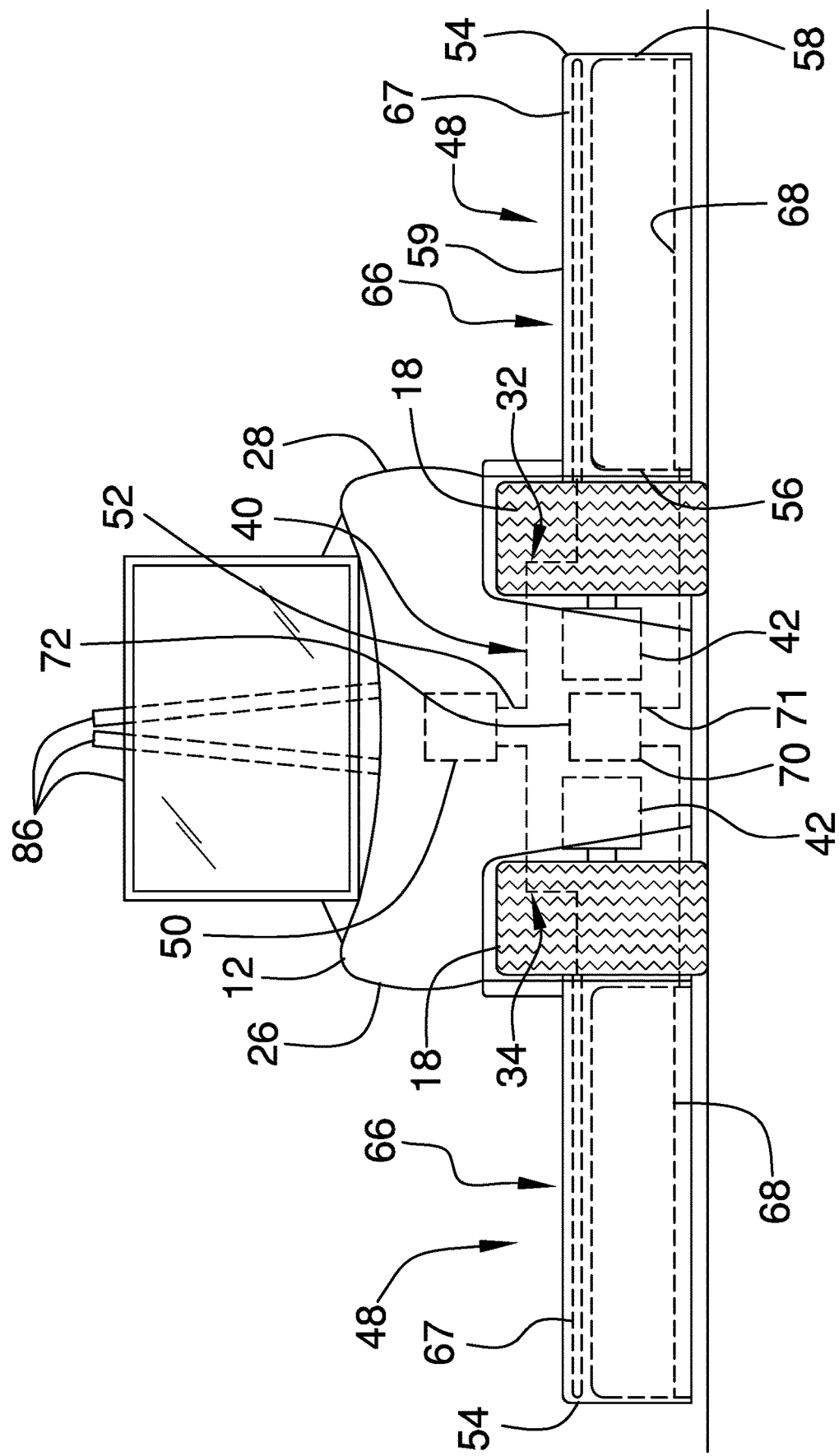
FIG. 4 is a back phantom view of an embodiment of the disclosure showing side resurfacing units in a deployed position.
Figure 5:
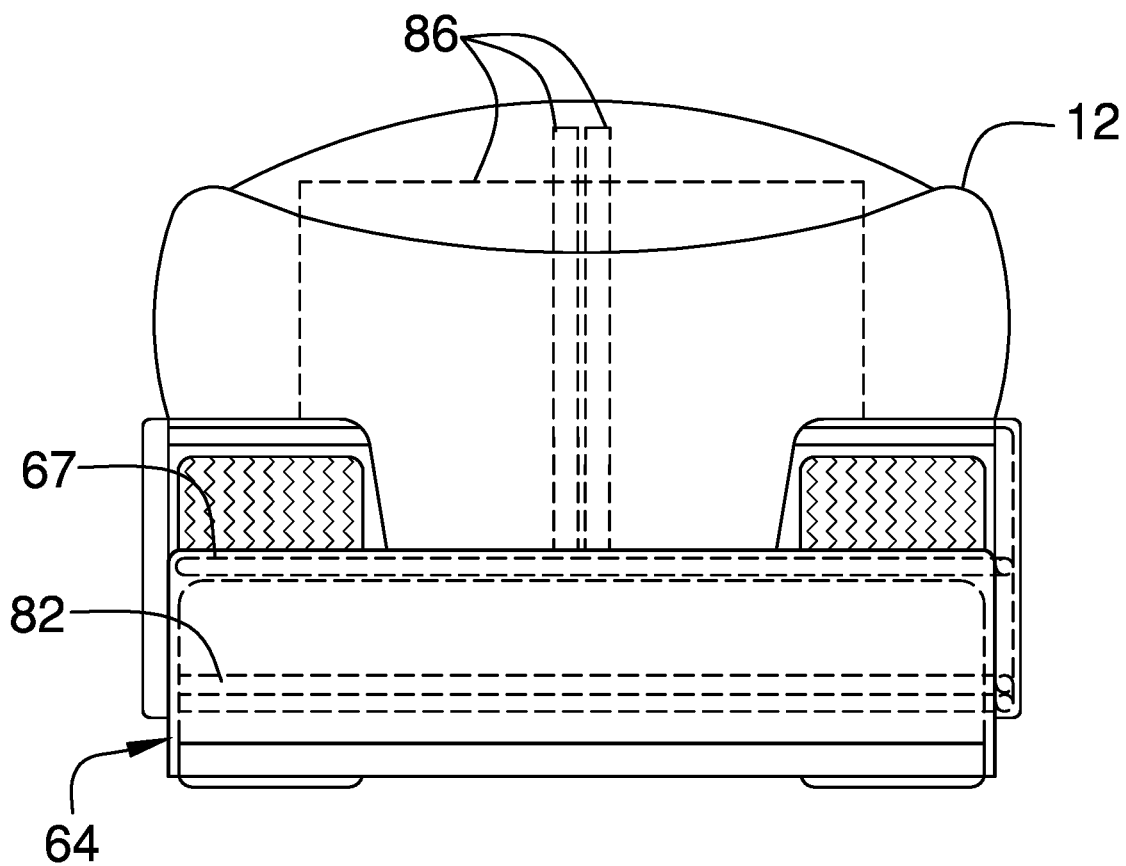
FIG. 5 is a back phantom view of an embodiment of the disclosure showing side resurfacing units in a stored position.
Figure 6:
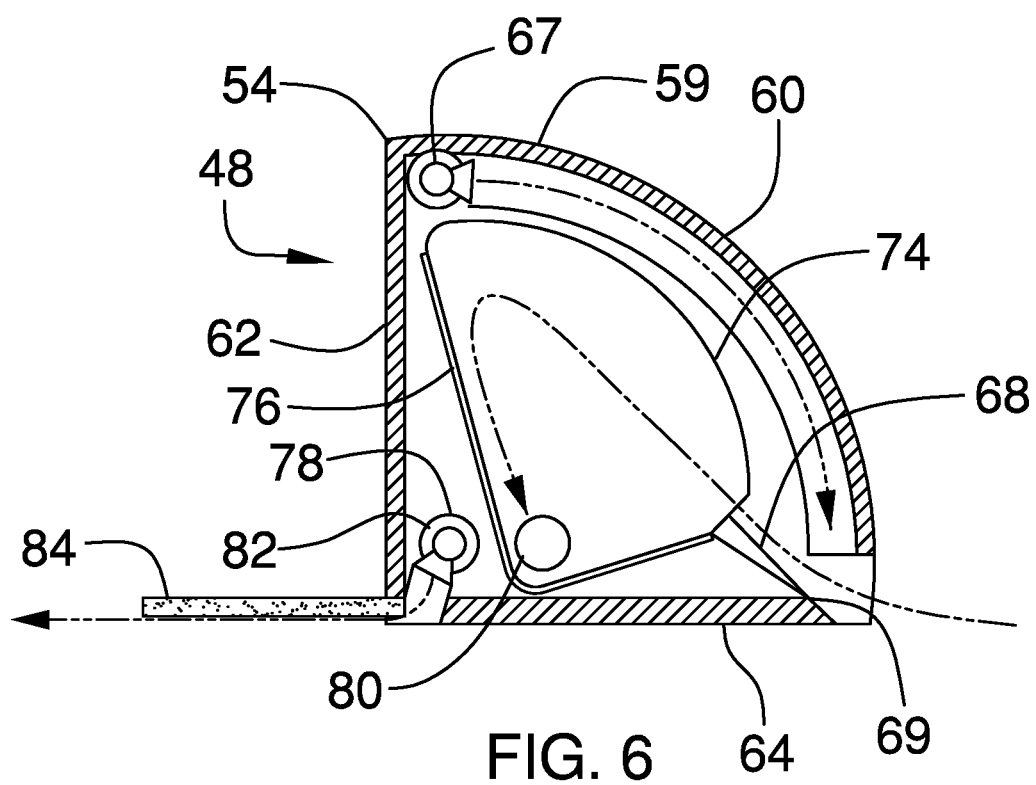
FIG. 6 is a cross sectional view taken along line 6-6 of FIG. 5 of an embodiment of the disclosure.
Figure 7:
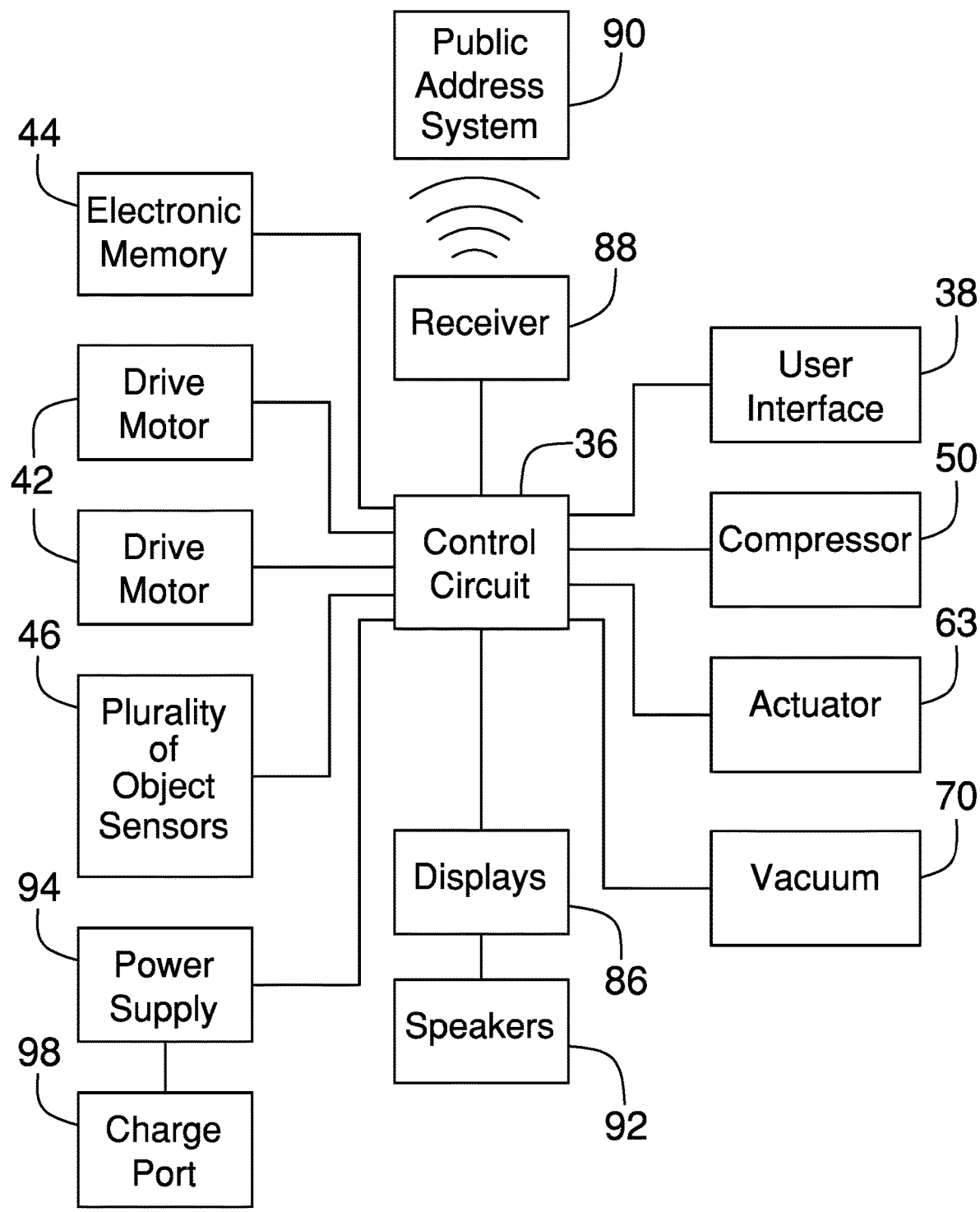
FIG. 7 is a schematic view of an embodiment of the disclosure.

With reference now to the drawings, and in particular to FIGS. 1 through 7 thereof, a new re-conditioning device embodying the principles and concepts of an embodiment of the disclosure and generally designated by the reference numeral 10 will be described.

As best illustrated in FIGS. 1 through 7, the ice re-conditioning assembly 10 generally comprises a vehicle 12 that is driven on ice 14 in an ice skating rink 16. The vehicle 12 includes a pair of front wheels 18 and a pair of back wheels 20. The ice skating rink 16 may be a hockey rink, a figure skating ring and any other skating ring of any design, including indoor and outdoor ice skating rinks. Each of the front 18 and back 20 wheels is rotatably coupled to the vehicle 12 for driving on the ice 14. Additionally, the back wheels 20 are steerable for steering the vehicle 12.

The vehicle 12 has a top side 22, a back side 24, a first lateral side 28 and a second lateral side 30. The first lateral side 28 has a first well 32 extending towards the second lateral side 30 and the second lateral side 30 has a second well 34 extending towards the first lateral side 28. Each of the front wheels 18 and the back wheels 20 are positioned on the back side 24.

A control circuit 36 is coupled to the vehicle 12 and the control circuit 36 may include a processor, a plurality of integrated circuits and any other control circuitry common to ice re-conditioning machines, such as a Zamboni and other ice re-conditioning machines. A user interface 38 is coupled to the vehicle 12 and the user interface 38 is manipulated by a user. The user interface 38 is electrically coupled to the control circuit 36 thereby facilitating operational parameters of the control circuit 36 to be entered by the user. The user interface 38 may include a touch screen display, a plurality of control buttons, a qwerty keyboard and any other type of electronic user interface 38.

A drive unit 40 is coupled to the vehicle 12 and the drive unit 40 is in mechanical communication with each of the front wheels 18. The drive unit 40 drives the vehicle 12 around the ice skating rink 16 in a pre-determined route. The drive unit 40 is electrically coupled to the control circuit 36 and the drive unit 40 comprises a plurality of drive motors 42. Each of front wheels 18 is rotatably coupled to a respective one of the drive motors 42.

Each of the front wheels 18 rotated in a forward direction or a rearward direction by the respective drive motor 42 for urging the vehicle 12 forwardly and rearwardly on the ice 14. Moreover, the back wheels 20 rotate about a vertical axis when the front wheels 18 are rotated in opposite directions with each other. In this way the vehicle 12 is maneuvered on the ice skating ring 16. Each of the drive motors 42 is electrically coupled to the control circuit 36 and each of the drive motors 42 may comprise a two direction electric motor.

An electronic memory 44 is coupled to the vehicle 12 and the electronic memory 44 is electrically coupled to the control circuit 36. The electronic memory 44 stores data comprising dimensions of the ice skating rink 16 and a route for the vehicle 12 to travel around the ice skating rink 16. The control circuit 36 actuates each of the drive motors 42 in accordance with the data in the electronic memory 44 to drive the vehicle 12 around the ice skating rink 16. The electronic memory 44 may comprise RAM memory, a hard disk drive and any other type of electronic memory 44. Additionally, a grid of conductors may be laid out beneath the ice 14 in the ice skating rink 16 and the drive unit 40 may include an electronic sensor for detecting a guidance signal in the conductors. Thus, the electronic sensor may communicate the guidance signal to the control circuit 36 for driving the vehicle 12 around the ice skating rink 16.

A plurality of object sensors 46 is provided and each of the object sensors 46 is coupled to the vehicle 12 for sensing objects on the ice 14, such as a person, a traffic cone, a hockey stick and any other object that may be found on the ice 14 in the ice skating rink 16. Each of the object sensors 46 is electrically coupled the control circuit 36 such that the control circuit 36 actuates the drive motors 42 to avoid objects sensed on the ice 14. The plurality of object sensors 46 is distributed around the vehicle 12 for detecting objects on all sides of the vehicle 12. Additionally, each of the object sensors 46 may be infra-red object sensors 46 or any other type of electronic object sensor.

A plurality of resurfacing units 48 is provided and each of the resurfacing units 48 is movably coupled to the vehicle 12. Each of the resurfacing units 48 is electrically coupled to the control circuit 36. Each of the resurfacing units 48 is urged into a deployed position having each of the resurfacing units 48 engaging the ice 14 for reconditioning the ice 14 for skating. Moreover, each of the resurfacing units 48 is urged into a stored position having each of the resurfacing units 48 being contained within the vehicle 12 and being spaced from the ice 14.

Each of the resurfacing units 48 includes a compressor 50 that is positioned within the vehicle 12 and the compressor 50 is electrically coupled to the control circuit 36. The compressor 50 has an output 52 for delivering compressed air outwardly therefrom. The compressor 50 may be an electric air compressor or the like. Each of the resurfacing units 48 includes a deck 54 that has a first end 56, a second end 58 and an outer wall 59 extending therebetween. The outer wall 59 has a top side 60, a bottom side 61 and a rear side 62, the top side 60 is concavely arcuate between the bottom 61 and rear sides 62 and the bottom side 61 is open.

Each of the resurfacing units 48 includes an actuator 63, such as a hydraulic piston, a linear actuator and any other type of mechanical actuator, that is coupled between the deck 54 of a respective one of the resurfacing units 48 and the vehicle 12. The actuator 63 on each of the resurfacing units 48 urges the respective resurfacing unit 48 between the stored position and the deployed position. The actuator 63 of each of the resurfacing units 48 is electrically coupled to the control circuit 36. Moreover, the plurality of resurfacing units 48 includes a center resurfacing unit 64 and a pair of side resurfacing units 65.

The first end 56 of the deck 54 of each of the side resurfacing units 65 is pivotally coupled to a respective one of the first 28 and second 30 lateral sides of the vehicle 12. Moreover, the deck 54 of each of the side resurfacing units 65 is positioned in a respective one of the first well 32 and the second well 34 when the side resurfacing units 65 are urged into the stored position. The deck 54 of each of the side resurfacing units 65 extends laterally away from the respective first 28 and second 30 lateral sides of the vehicle 12 when the side resurfacing units 65 are urged into the deployed position. Additionally, the deck 54 of each of the side resurfacing units 65 is lowered downwardly when each of the side resurfacing units 65 is urged into the deployed position such that the bottom side 61 of the outer wall 59 of the deck 54 of each of the side resurfacing units 65 engages the ice 14.

The deck 54 of the center resurfacing unit 64 is positioned on the back side 24 of the vehicle 12. Additionally, the center resurfacing unit 64 is lowered onto the ice 14 when the center resurfacing unit 64 is positioned in the deployed position and the center resurfacing unit 64 is lifted from the ice 14 when the center resurfacing unit 64 is positioned in the stored position. The center resurfacing unit 64 includes a pair of lift arms 66 that are each pivotally coupled between the deck 54 of the center resurfacing unit 64 and the back side 24 of the vehicle 12. The actuator 63 associated with the center resurfacing unit 64 may comprise a lift motor that is mechanically coupled to the lift arms 66 for lifting and lowering the lift arms 66.

Each of the resurfacing units 48 includes a plurality of air nozzles 67 and each of the air nozzles 67 is positioned in of the deck 54. The air nozzles 67 are distributed between the first end 56 and the second end 58 and each of the air nozzles 67 is fluidly coupled to the output 52 of the compressor 50. The air nozzles 67 are aligned with an intersection between the rear 62 and top 60 sides of the outer wall 59 of the deck 54 and each of the air nozzles 67 is directed toward the top side 60. Thus, each of the air nozzles 67 directs the compressed air downwardly along the curvature of the top side 60 onto the ice 14 when the outer wall 59 engages the ice 14 for dislodging loose particles on the ice 14. An ice scraper 68 is positioned within the deck 54 and the ice scraper 68 has a scraping edge 69. The scraping edge 69 is aligned with the outer wall 59 such that the scraping edge 69 abrades the ice 14 and collects the dislodged loose particles on the ice 14 when the outer wall 59 engages the ice 14. In this way the ice scraper 68 levels the ice 14 when the vehicle 12 drives on the ice 14.

Each of the resurfacing units 48 includes a vacuum 70 that is positioned within the deck 54 and the vacuum 70 has an intake 71 and an exhaust 72. The intake 71 is in fluid communication with the ice scraper 68 for suctionally removing ice shavings and the loose particles from the ice scraper 68. A reservoir 74 is positioned within the deck 54 and the reservoir 74 is fluidly coupled to the exhaust 72 of the vacuum 70 to receive the ice shavings and the loose particles.

Each of the resurfacing units 48 includes a heating element 76 is coupled to the reservoir 74 such that the heating element 76 is in thermal communication with the reservoir 74. The heating element 76 is electrically coupled to the control circuit 36 and the heating element 76 is turned on when the outer wall 59 of the deck 54 engages the ice 14. In this way the heating element 76 melts the ice shavings collected in the reservoir 74. The heating element 76 may be an electric heating element or the like. The reservoir 74 has a drain 78 and a filter 80 is positioned within the drain 78. The filter 80 filters loose particles from the melted ice shavings when the melted ice shavings pass through the filter 80 and outwardly through the drain 78.

Each of the resurfacing units 48 includes a plurality of fluid nozzles 82 and each of the fluid nozzles 82 is coupled to the outer wall 59 of the deck 54. Each of the fluid nozzles 82 is fluidly coupled to the drain 78 such that each of the fluid nozzles 82 sprays the melted ice shavings downwardly onto the ice 14 for re-freezing. The fluid nozzles 82 are distributed between the first 56 and second 58 ends of the deck 54 to evenly distribute the melted ice shavings on the ice 14. Each of the resurfacing units 48 includes a towel 84 that is coupled to and extends away from an intersection between the bottom 61 and rear 62 sides of the outer wall 59 of the deck 54 of each of the resurfacing units 48. The towel 84 on each of the resurfacing units 48 smoothes the melted ice shavings on the ice 14 to condition the resulting freshly frozen ice 14.

A plurality of displays 86 is provided and each of the displays 86 is movably coupled to the vehicle 12. Each of the displays 86 is electrically coupled to the control circuit 36 and each of the displays 86 unit displays indicia comprising words and images for advertising purposes. Each of the displays 86 extends upwardly from the top side 22 of the vehicle 12. Moreover, the displays 86 are distributed around the vehicle 12 such that the displays 86 are visible 360° around the vehicle 12. Each of the displays 86 may comprise a flat screen LCD or the like and each of the displays 86 may have a length sufficient to extend along a width and length of the vehicle 12. Each of the displays 86 may retract into the top side 22 of the vehicle 12 through a plurality of tracks and motors that engage the tracks or any other conventional mechanical means of urging the displays 86 up and down on the vehicle 12.

A receiver 88 is coupled to the vehicle 12 and the receiver 88 is electrically coupled to the control circuit 36. The receiver 88 is in electrical communication with an external public address system 90 that is located in the ice skating rink 16. The receiver 88 may be a radio frequency receiver or the like and the receiver 88 may employ a WPAN signal and Bluetooth communication protocols. A plurality of speakers 92 is provided and each of the speakers 92 is coupled to the vehicle 12. Each of the speakers 92 are electrically coupled the control circuit 36 to receive an audio signal from the receiver 88. In this way each of the speakers 92 may emit audio that is synchronized with audio emitted by the external public address system 90. Each of the speakers 92 may be powered speakers of any conventional design.

A power supply 94 is coupled to the vehicle 12 and the power supply 94 is electrically coupled to the control circuit 36. The power supply 94 comprises at least one rechargeable battery 96 that is positioned within the vehicle 12. A charge port 98 to is coupled to the vehicle 12 and the charge port 98 is electrically coupled to the at least one rechargeable battery 96. The charge port 98 is selectively and electrically coupled to a power source, such as a battery charger or a female electrical outlet, for charging the at least one rechargeable battery 96.

In use, the dimensions of the ice skating rink 16 and the pre-determined route are programmed into the electronic memory 44 with the user interface 38. Additionally, the motion of the resurfacing units 48, including but not being limited to, the depth of ice 14 to be scraped, the amount of melted ice shavings to be sprayed onto the ice 14 and a temperature of the heating element 76 are programmed into the electronic memory 44. The deck 54 of each resurfacing unit 48 is extended laterally away from the vehicle 12 and is lowered downwardly onto the ice 14 when the resurfacing units 48 are positioned in the deployed position. Additionally, the center resurfacing unit 64 is lowered onto the ice 14 when the resurfacing units 48 are positioned in the deployed position. The vehicle 12 drives around the ice skating rink 16 according to the pre-determined route and the resurfacing units 48 re-condition the ice 14 in the ice skating rink 16 for ice skating in accordance with parameters entered with the user interface 38. The display 86 displays the indicia for advertising purposes and the speakers 92 emit the audio while the vehicle 12 drives around the ice skating rink 16. Each of the resurfacing units 48 is positioned in the stored position before the vehicle 12 drives off of the ice skating rink 16. In this way the ice 14 on the ice skating rink 16 is resurfaced automatically and efficiently.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An ice re-conditioning assembly for automatically driving around an ice skating rink for re-conditioning ice for skating, said assembly comprising:
   a vehicle being driven on ice in a ice skating rink, said vehicle including a pair of front wheels and at least one back wheel, each of said front wheels and said back wheel being rotatably coupled to said vehicle for driving on the ice, said back wheel being steerable thereby facilitating a zero turning radius for said vehicle;
   a control circuit being coupled to said vehicle;
   a drive unit being coupled to said vehicle, said drive unit being in mechanical communication with each of said front wheels for driving said vehicle around the ice skating rink in a pre-determined route, said drive unit being electrically coupled to said control circuit;

a plurality of resurfacing units, each of said resurfacing units being movably coupled to said vehicle, each of said resurfacing units being electrically coupled to said control circuit, each of said resurfacing units being urged into a deployed position having each of said resurfacing units extending laterally away from said vehicle and engaging the ice for reconditioning the ice for skating, each of said resurfacing units being urged into a stored position having each of said resurfacing units being contained within said vehicle and being spaced from the ice; and a plurality of displays, each of said displays being coupled to said vehicle, each of said displays being electrically coupled to said control circuit, each of said displays displaying indicia comprising words and images for advertising purposes.

2. The assembly according to claim 1, further comprising said vehicle having a top side, a bottom side and an outer surface extending therebetween, said outer surface having a first lateral side and a second lateral side, said first lateral side having a first well extending towards said second lateral side, said second lateral side having a second well extending towards said first lateral side, each of said front wheels and said back wheels being positioned on said bottom side.

3. The assembly according to claim 2, further comprising a user interface being coupled to said vehicle wherein said user interface is configured to be manipulated by a user, said user interface being electrically coupled to said control circuit thereby facilitating operational parameters of said control circuit to be entered by the user.

4. The assembly according to claim 2, wherein said drive unit comprises a plurality of drive motors, each of front wheels being rotatably coupled to a respective one of said drive motors, each of said front wheels being rotated in a forward direction or a rearward direction by said respective drive motor for urging the vehicle forwardly and rearwardly on the ice, said back wheels being rotated about a vertical axis when said front wheels are rotated in opposite directions from each other for steering said vehicle, each of said drive motors being electrically coupled to said control circuit.

5. The assembly according to claim 4, further comprising an electronic memory being coupled to said vehicle, said electronic memory being electrically coupled to said control circuit, said electronic memory storing data comprising dimensions of the ice-ice skating rink and a route for said vehicle to travel around the ice-ice skating rink, said control circuit actuating each of said drive motors in accordance with said data in said electronic memory to drive said vehicle around the ice skating rink.

6. The assembly according to claim 5, further comprising a plurality of object sensors, each of said object sensors being coupled to said vehicle such that each of said object sensors senses objects on the ice, each of said object sensors being electrically coupled said control circuit such that said control circuit actuates said drive motors to avoid objects sensed on the ice, said plurality of object sensors being distributed around said vehicle for detecting objects on all sides of said vehicle.

7. The assembly according to claim 6, wherein each of said resurfacing units comprises a compressor being positioned within said vehicle, said compressor being electrically coupled to said control circuit, said compressor having an output for delivering compressed air outwardly therefrom.

8. The assembly according to claim 7, wherein each of said resurfacing units further includes:

a deck having a first end, a second end and a outer wall, said outer wall having a top side, a bottom side and a rear side, said top side being concavely arcuate between said bottom and rear sides;

said deck of respective ones of said resurfacing units being positioned in a respective one of said first well and said second well when said respective resurfacing units are urged into said stored position; and said deck of each of said respective resurfacing units extending laterally away from a respective one of said first lateral side and said second lateral side of said vehicle when said respective resurfacing units are urged into said deployed position, said deck of each of said respective resurfacing units being lowered downwardly when each of said respective resurfacing units is urged into said deployed position having said outer wall of said respective resurfacing units engaging the ice.

9. The assembly according to claim 8, further comprising a plurality of air nozzles, each of said air nozzles being coupled to said outer wall of said deck, said air nozzles being distributed between said first end and said second end, each of said air nozzles being fluidly coupled to said output of said compressor such that each of said air nozzles directs the compressed air downwardly onto the ice when said outer wall engages the ice for dislodging loose particles on the ice.

10. The assembly according to claim 9, further comprising an ice scraper being positioned within said deck, said ice scraper having a scraping edge, said scraping edge being aligned with said outer wall such that said scraping edge abrades the ice and collects the dislodged loose particles on the ice when said outer wall engages the ice wherein said ice scraper is configured to level the ice.

11. The assembly according to claim 10, further comprising a vacuum being positioned within said deck, said vacuum having an intake and an exhaust, said intake being in fluid communication with said ice scraper for suctioning a removing ice shavings and the loose particles from said ice scraper.

12. The assembly according to claim 11, further comprising a reservoir being positioned within said deck, said reservoir being fluidly coupled to said exhaust of said vacuum such that said reservoir receives the ice shavings and the loose particles, said reservoir having a drain.

13. The assembly according to claim 12, further comprising a heating element being coupled to said reservoir such that said heating element is in thermal communication with said reservoir, said heating element being electrically coupled to said control circuit, said heating element being turned on when said outer wall of said deck engages the ice wherein said heating element is configured to melt the ice shavings collected in said reservoir.

14. The assembly according to claim 13, further comprising a filter being positioned within said drain such that said filter filters loose particles from the melted ice shavings.

15. The assembly according to claim 12, further comprising a plurality of fluid nozzles, each of said fluid nozzles being coupled to said outer wall of said deck, each of said fluid nozzles being fluidly coupled to said drain such that each of said fluid nozzles sprays the melted ice shavings downwardly onto the ice for re-freezing.

16. The assembly according to claim 1, further comprising:

a receiver being coupled to said vehicle, said receiver being electrically coupled to said control circuit, said receiver being in electrical communication with an external public address system; and a plurality of speakers, each of said speakers being coupled to said vehicle, each of said speakers being electrically coupled said control circuit such that each of said speakers receives an audio signal from said receiver wherein each of said speakers is configured to emit audio that is synchronized with audio emitted by the external public address system.

17. The assembly according to claim 1, further comprising a power supply being coupled to said vehicle, said power supply being electrically coupled to said control circuit, said power supply comprising:

at least one rechargeable battery being positioned within said vehicle; and a charge port to being coupled to said vehicle, said charge port being electrically coupled to said at least one rechargeable battery, said charge port being selectively and electrically coupled to a power source for charging said at least one rechargeable battery.

18. An ice re-conditioning assembly for automatically driving around an ice skating rink for re-conditioning ice for skating, said assembly comprising:

a vehicle being driven on ice in a ice skating rink, said vehicle including a pair of front wheels and a pair of back wheels, each of said front wheels and said back wheels being rotatably coupled to said vehicle for driving on the ice, each of said front wheels and said back wheels being steerable thereby facilitating a zero turning radius for said vehicle, said vehicle having a top side, a bottom side and an outer surface extending therebetween, said outer surface having a first lateral side and a second lateral side, said first lateral side having a first well extending towards said second lateral side, said second lateral side having a second well extending towards said first lateral side, each of said front wheels and said back wheels being positioned on said bottom side;

a control circuit being coupled to said vehicle;

a user interface being coupled to said vehicle wherein said user interface is configured to be manipulated by a user, said user interface being electrically coupled to said control circuit thereby facilitating operational parameters of said control circuit to be entered by the user;

a drive unit being coupled to said vehicle, said drive unit being in mechanical communication with each of said front wheels and each of said back wheels for driving said vehicle around the ice skating rink in a predetermined route, said drive unit being electrically coupled to said control circuit, said drive unit comprising:

a plurality of drive motors, each of front wheels being rotatably coupled to a respective one of said drive motors, each of said front wheels being rotated in a forward direction or a rearward direction by said respective drive motor for urging the vehicle forwardly and rearwardly on the ice, said back wheels being rotated about a vertical axis when said front wheels are rotated in opposite directions from each other for steering said vehicle, each of said drive motors being electrically coupled to said control circuit;

an electronic memory being coupled to said vehicle, said electronic memory being electrically coupled to said control circuit, said electronic memory storing data comprising dimensions of the ice-ice skating rink and a route for said vehicle to travel around the ice-ice skating rink, said control circuit actuating each of said drive motors in accordance with said data in said electronic memory to drive said vehicle around the ice skating rink; and a plurality of object sensors, each of said object sensors being coupled to said vehicle such that each of said object sensors senses objects on the ice, each of said object sensors being electrically coupled said control circuit such that said control circuit actuates said drive motors to avoid objects sensed on the ice, said plurality of object sensors being distributed around said vehicle for detecting objects on all sides of said vehicle;

a plurality of resurfacing units, each of said resurfacing units being movably coupled to said vehicle, each of said resurfacing units being electrically coupled to said control circuit, each of said resurfacing units being urged into a deployed position having each of said resurfacing units extending laterally away from said vehicle and engaging the ice for reconditioning the ice for skating, each of said resurfacing units being urged into a stored position having each of said resurfacing units being contained within said vehicle and being spaced from the ice, each of said resurfacing units comprising:

a compressor being positioned within said vehicle, said compressor being electrically coupled to said control circuit, said compressor having an output for delivering compressed air outwardly therefrom;

a deck having a first end, a second end and a outer wall, said outer wall having a top side, a bottom side and a rear side, said top side being concavely arcuate between said bottom and rear sides, said deck of respective ones of said resurfacing units being positioned in a respective one of said first well and said second well when said respective resurfacing units are urged into said stored position, said deck of each of said respective resurfacing units extending laterally away from a respective one of said first lateral side and said second lateral side of said vehicle when said respective resurfacing units are urged into said deployed position, said deck of each of said respective resurfacing units being lowered downwardly when each of said respective resurfacing units is urged into said deployed position having said outer wall of said respective resurfacing units engaging the ice;

a plurality of air nozzles, each of said air nozzles being coupled to said outer wall of said deck, said air nozzles being distributed between said first end and said second end, each of said air nozzles being fluidly coupled to said output of said compressor such that each of said air nozzles directs the compressed air downwardly onto the ice when said outer wall engages the ice for dislodging loose particles on the ice;

an ice scraper being positioned within said deck, said ice scraper having a scraping edge, said scraping edge being aligned with said outer wall such that said scraping edge abrades the ice and collects the dislodged loose particles on the ice when said outer wall engages the ice wherein said ice scraper is configured to level the ice;

a vacuum being positioned within said deck, said vacuum having an intake and an exhaust, said intake being in fluid communication with said ice scraper for suctioning a removing ice shavings and the loose particles from said ice scraper;
a reservoir being positioned within said deck, said reservoir being fluidly coupled to said exhaust of said vacuum such that said reservoir receives the ice shavings and the loose particles, said reservoir having a drain;
a heating element being coupled to said reservoir such that said heating element is in thermal communication with said reservoir, said heating element being electrically coupled to said control circuit, said heating element being turned on when said outer wall of said deck engages the ice wherein said heating element is configured to melt the ice shavings collected in said reservoir;
a filter being positioned within said drain such that said filter filters loose particles from the melted ice shavings; and
a plurality of fluid nozzles, each of said fluid nozzles being coupled to said outer wall of said deck, each of said fluid nozzles being fluidly coupled to said drain such that each of said fluid nozzles sprays the melted ice shavings downwardly onto the ice for re-freezing;
a plurality of displays, each of said displays being coupled to said vehicle, each of said displays being electrically coupled to said control circuit, each of said displays displaying indicia comprising words and images for advertising purposes, each of said displays being coupled to and extending upwardly from said top side of said vehicle, said displays being distributed around said vehicle such that said displays are visible 360° around said vehicle;
a receiver being coupled to said vehicle, said receiver being electrically coupled to said control circuit, said receiver being in electrical communication with an external public address system;
a plurality of speakers, each of said speakers being coupled to said vehicle, each of said speakers being electrically coupled said control circuit such that each of said speakers receives an audio signal from said receiver wherein each of said speakers is configured to emit audio that is synchronized with audio emitted by the external public address system; and
a power supply being coupled to said vehicle, said power supply being electrically coupled to said control circuit, said power supply comprising:
at least one rechargeable battery being positioned within said vehicle; and
a charge port to being coupled to said vehicle, said charge port being electrically coupled to said at least one rechargeable battery, said charge port being selectively and electrically coupled to a power source for charging said at least one rechargeable battery.

* * * * *